United States Patent [19]

Nagai et al.

[11] Patent Number: 4,898,902

[45] Date of Patent: Feb. 6, 1990

[54] BINDER COMPOSITION FOR INJECTION MOLDING

[75] Inventors: Tomoaki Nagai; Hideyuki Yamanashi; Hideo Hachimori, all of Tokyo, Japan

[73] Assignees: Adeka Fine Chemical Co., Ltd.; Asahi Denka Kogyo Kabushiki Kaisha, both of Tokyo, Japan

[21] Appl. No.: 211,756

[22] Filed: Jun. 27, 1988

[30] Foreign Application Priority Data

Jul. 3, 1987 [JP] Japan .................................. 62-166297
May 31, 1988 [JP] Japan .................................. 63-133864

[51] Int. Cl.[4] .......................... C08L 71/02; C08K 5/10
[52] U.S. Cl. ...................................... 524/275; 524/277; 524/300; 524/317; 524/318; 524/322; 524/394; 524/400; 524/487; 524/488; 524/489; 524/612
[58] Field of Search ............... 524/277, 275, 487, 488, 524/489, 322, 300, 318, 317, 400, 394, 612

[56] References Cited

U.S. PATENT DOCUMENTS 3,298,980 1/1967 Lundberg et al. ................... 524/612
3,941,865 3/1976 Miller et al. ......................... 524/612
4,017,452 4/1977 Schwarz .............................. 524/612

FOREIGN PATENT DOCUMENTS 121150 7/1984 Japan .
121151 7/1984 Japan .

*Primary Examiner*—Lewis T. Jacobs
*Attorney, Agent, or Firm*—Frishauf, Holtz, Goodman & Woodward

[57] ABSTRACT

A binder composition for injection molding of at least one of metal powder and ceramic powder which comprises polyoxyethylene/polyoxypropylene condensation polyether as the main component together with from 10 to 100 parts by weight of at least one auxiliary component selected from the group consisting of natural waxes, synthetic waxes, fatty acids and esters per 100 parts of said polyoxyethyene/polyoxypropylene condensation polyether.

17 Claims, No Drawings

BINDER COMPOSITION FOR INJECTION MOLDING

BACKGROUND OF THE INVENTION

1. Field of the Invention: This invention relates to a binder composition for injection molding. More particularly, it relates to a binder composition for injection molding which is excellent in various properties such as capability of molding, degreasing and sintering.

2. Description of Prior Art:

Metal powders such as iron or alloy powders and ceramic powders are generally injection molded by a process comprising the steps of adding a binder to a metal or ceramic powder to thereby give a composition, injection molding the composition with an injection molding machine, removing the binder from the molded product, i.e., degreasing, and sintering the molded product thus degreased to thereby give the aimed product.

The binder to be used in the above process should satisfy the following requirements.

(1) The composition containing the binder can be injection molded with an injection molding machine.

(2) The injection-molded product obtained from the above composition has such a strength as not to be broken until entering the subsequent sintering step.

(3) The molded product can be readily degreased, i.e., it can be degreased within a short period of time at a low degreasing temperature.

(4) The degreased product has a sufficient strength.

(5) The molded product has a high sinterability. That is, it shows a small dimensional change and a high strength and can give a highly dense product.

As such a binder, thermoplastic resins and waxes have been employed (cf. Japanese Patent Laid-Open No. 121150/1984 and No. 121151/1984).

Although these known binders satisfy the requirement (1) as described above, other properties thereof are still unsatisfactory. For example, a conventional binder mainly comprising a wax or a thermoplastic resin requires at least several tens of hours for degreasing. Such a prolonged degreasing can yield nothing but a small molded product. Further the resulting product frequently suffers from blistering, cracking or breakage during the degreasing step. Thus an excellent product can be scarcely obtained thereby. When no thermoplastic resin is employed, on the other hand, the obtained composition shows a poor moldability, which brings about a serious problem in practice.

SUMMARY OF THE INVENTION

It is an object of the present invention to provide a binder composition for injection molding which satisfies all of the abovementioned requirements, more particularly to a binder composition for injection molding which is excellent in various properties such as capability of molding, degreasing and sintering.

In the present invention, the above object can be achieved by providing a binder composition for injection molding which comprises polyoxyethylene/polyoxypropylene condensation polyether as the main component.

DETAILED DESCRIPTION OF THE INVENTION

The polyoxyethylene/polyoxypropylene condensation polyether, which is the main component of the binder composition for injection molding of the present invention, may be obtained by condensing a polyhydric alcohol such as ethylene glycol, propylene glycol or glycerol or a polyvalent amine such as ethylenediamine with ethylene oxide and propylene oxide. It is preferable that the polyoxyethylene/polyoxypropylene condensation polyether has an average molecular weight of 7,000 to 26,000. When the average molecular weight thereof is less than 7,000, the composition might have a low moldability. When it exceeds 26,000, on the other hand, the resulting compound might be somewhat unstable.

It is preferable that the polyoxyethylene/polyoxypropylene condensation polyether contains 60 to 90% by weight of ethylene oxide. When the content of ethylene oxide is less than 60% by weight, the composition might be poor in both moldability and releasability. When it exceeds 90% by weight, on the other hand, the composition might be somewhat unstable.

Preferable examples of the polyoxyethylene/polyoxypropylene condensation polyether as mentioned above include Pluronic® surfactant and Tetronic® surfactant, each manufactured by Asahi Danka Kogyo K.K.

It is preferable that the binder composition for injection molding of the present invention comprises the abovementioned polyoxyethylene/polyoxypropylene condensation polyether as the main component together with one or more compounds selected from among natural waxes, synthetic waxes, fatty acids, esters, metal soaps and water as auxiliary component(s).

It is preferable that the auxiliary component(s) as mentioned above are blended in an amount of 10 to 100 parts by weight per 100 parts by weight of the polyoxyethylene/polyoxypropylene condensation polyether, i.e., the main component. It is particularly preferable to blend these components in such a manner that the resulting binder composition for injection molding of the present invention is solid at room temperature and has a pour point of 40° to 100° C. This is because when the binder composition for injection molding is solid at room temperature, a mixture obtained by kneading the same with, for example, a metal powder may be readily pelletized and injection molded and the molded product thus obtained has excellent moldability. Furthermore, when the pour point of the binder composition for injection molding is 40° to 100° C., the molding can be effected at a temperature below 100° C.

The binder composition for injection molding of the present invention comprising water as the auxiliary component is particularly preferable since the viscosity of said binder can be readily adjusted without using any polymer resin and the composition has an excellent effect of degreasing.

Examples of the natural wax to be used as the auxiliary component in the present invention as described above include vegetable waxes such as carnauba wax and candelilla wax and mineral waxes such as ceresin and montan wax. Examples of the synthetic wax as described above include amine/amide wax, paraffin wax, microcrystalline wax, polyethylene wax and polypropylene wax.

Examples of the fatty acid to be used as the auxiliary component in the present invention as described above include stearic acid, palmitic acid, and oleic acid as well as other saturated or unsaturated fatty acids carrying 4 to 30 carbon atoms. Further natural fatty acids such as coconut oil fatty acids may be employed therefor.

Examples of the ester to be used as the auxiliary component in the present invention as described above include butyl stearate, oleyl oleate, glycerol monostearate, methyl esters of coconut fatty acids and sorbitan ester.

Examples of the metal soap to be used as the auxiliary component in the present invention as described above include calcium, magnesium and aluminium salts as well as other metal salts of fatty acids such as stearic acid, palmitic acid and oleic acid.

When an injection molding composition is to be prepared by using the binder composition for injection molding of the present invention, it is preferable that said binder composition for injection molding of the present invention is added to a metal or ceramic powder and kneaded with the same at a temperature of 80° to 150° C. The amount of the binder composition for injection molding to be added may be controlled in a conventional manner depending on the particle size distribution of the employed metal or ceramic powder.

Examples of said metal powder to which the binder composition for injection molding of the present invention is to be added include metallic silicon powder, iron or iron-alloy powder such as high-speed steel powder, hard metal powder obtained from, for example, titanium, tungsten or boron and a magnetic material powder. On the other hand, examples of said ceramic powder include silicon nitride powder, silicon carbide powder, alumina powder, zirconia powder and sialon (silicon nitride/alumina) powder. In addition, a cermet powder obtained by blending a metal powder with a ceramic powder may be employed therefor. Furthermore, a mixture of two or more metal and/or ceramic powders as mentioned above may be employed, if desired.

The composition containing the binder composition for injection molding of the present invention may be injection molded, degreased and sintered in a conventional manner.

By using the binder composition for injection molding as described above, degreasing may be effected at a temperature of 300° C. in three hours to thereby achieve a degreasing ratio of approximately 50% or above. The composition may be almost completely degreased within 10 to 15 hours or less in general or sometimes within approximately five hours depending on the shape of the molded product.

To further illustrate the present invention, the following Examples will be given.

EXAMPLE 1

(1) Preparation of composition

To 100 parts (by weight, the same will apply hereinafter) of an alloy powder (SUS 304L, average particle size: 20 μ) was added 12.10 parts of a binder composition for injection molding as shown in Table 1 (added composition/(powder+composition)=10.8%). The resulting mixture was kneaded in a kneader at 60° to 90° C. for 40 minutes to thereby thoroughly fluidize the same. Then the fluidized material was pelletized with a pelletizer and the obtained pellets were cooled to room temperature.

(2) Injection molding

The pellets as obtained above were molded by using a screw-type injection molding machine wherein a cylinder temperature at a metering zone was adjusted to 60° C., those at a compression zone and a supply zone were adjusted to 55° C. and 50° C. respectively, the mold temperature was adjusted to room temperature and the screw speed, back pressure, injection molding rate and dwelling were controlled in a conventional manner, to thereby give a molded product which was a JIS tension dumbbell (tension zone width: 10 mm, thickness: 5 mm, length: 30 mm, and total length involving grip: 80 mm).

(3) Degreasing

The molded product as obtained above was heated to 400° C. at a rate of 100° C./hr and maintained at this temperature for two hours to thereby degrease the same. The results were as follows:

| | |
|---|---|
| weight of product before degreasing: | 28.79 g (0.119), |
| weight of product after degreasing: | 25.69 g (0.125), |
| weight loss: | 10.78% (0.08) and |
| degreasing ratio: | 99.81%. |

Each weight is the average of eight molded products and each value in parentheses represents the standard deviation.

(4) Sintering

The degreased product was sintered in a conventional manner. The results were as follows:

| | |
|---|---|
| relative density: | 96%, |
| tensile strength: | 48 kg · f/cm$^2$ and |
| hardness (HRB): | 68. |

EXAMPLE 2

(1) Preparation of composition

To 100 parts of an iron powder (average particle size: 15 to 16 μ) was added 9.6 parts of a binder composition for injection molding as shown in Table 1 (added composition/(powder+composition)=8.8%). The resulting mixture was kneaded in a mixer at 60° to 90° C. to thereby thoroughly fluidize the same. Then the kneaded material was cooled and granulated.

(2) Injection molding

These granules were molded in the same manner as the one described in Example 1 to thereby give a molded material, i.e., a JIS tension dumbbell.

(3) Degreasing

The molded product as obtained above was heated to 250° C. at a rate of 100° C./hr and maintained at this temperature for two hours to thereby degrease the same. The degreasing ratio thus achieved was 99.8%.

(4) Sintering

The degreased product was sintered in a conventional manner. The results were as follows:

| | |
|---|---|
| relative density: | 93% and |
| tensile strength: | 16 kg · f/cm$^2$. |

EXAMPLE 3

To 100 parts of a ceramic powder (fine ceramic/alumina AL160SG) was added 2.0 parts of a binder composition for injection molding as shown in Table 1 (added composition/(powder+composition)=16.7%). The resulting mixture was kneaded in a mixer at 90° to 110° C. to thereby thoroughly fluidize the same.

(2) Injection molding

The kneaded material as obtained above was molded by using an injection molding machine wherein a cylinder temperature at a metering zone was adjusted to 70° C., those at a compression zone and a supply zone were adjusted to 80° C. and 90° C. respectively, the mold temperature was adjusted to room temperature and the screw speed, back pressure, injection molding rate and dwelling were controlled in a conventional manner, to thereby give a molded product in the form of a plate (40 mm×60 mm×1.5 mm).

(3) Degreasing

The molded product as obtained above was heated to 100° C. within 60 minutes and then to 300° C. at a rate of 20° C./hr. Then it was maintained at this temperature for two hours to thereby degrease the same (total degreasing period: 13 hours). The degreasing ratio thus achieved was 90%.

The abovementioned molded product was heated to 100° C. within 60 minutes and then to 300° C. at a rate of 50° C./hr. Then it was maintained at this temperature for two hours to thereby degrease the same (total degreasing time: seven hours). The degreasing ratio thus achieved was 85 to 90%.

EXAMPLE 4

To 100 parts of a ceramic powder (fine ceramic/zirconia, specific gravity: 6.27, average particle size: 0.02 mm) was added 22.3 parts of the binder composition for injection molding as shown in Table 1 (added composition/(powder+composition)=18.3%). The resulting mixture was kneaded in a pressure kneader at 90° C. and at 30 rpm for 40 minutes.

(2) Injection molding

The kneaded material as obtained above was molded by using an injection molding machine wherein cylinder temperatures at a metering zone, a compression zone and a supply zone were each adjusted to 70° C., the mold temperature was adjusted to room temperature, the screw speed, back pressure, injection molding rate and dwelling were controlled in a conventional manner and a 10 R nozzle for FP was employed, to thereby give a molded product in the form of a plate (50.0 mm×50.0 mm×4.0 mm).

(3) Degreasing

The molded product as obtained above was heated to 100° C. within 60 minutes and then to 300° C. at a rate of 20° C./hr. Then it was further heated to 400° C. at a rate of 50° C./hr to thereby degrease the same (total degreasing time: 13 hours). The degreasing ratio thus achieve was 88%.

(4) Sintering

The molded product thus degreased was heated to 1500° C. within 15 hours and then maintained at this temperature for two hours. Thus it was sintered in the atmosphere. The degreasing ratio of the sintered product was 94.4%.

EXAMPLES 5 TO 9 AND COMPARATIVE EXAMPLE 1

The procedure of Example 1 was repeated except that each binder composition for injection molding as shown in Table 1 was employed. Each molded product thus obtained had a degreasing ratio as shown in Table 1.

TABLE 1

| | | Component of binder composition for injection molding (% by weight) | | | | | | | | | | | | |
|---|---|---|---|---|---|---|---|---|---|---|---|---|---|---|
| | | polyoxyethylene/ polyoxypropylene condensation polyether | | | natural wax | | fatty acid stearic | ester butyl | synthetic wax paraffin | | | | Weight of molded | Degreasing | Degreasing |
| No. | Powder | *1 | *2 | *3 | montan wax | carnauba wax | acid | stearate | wax *4 | metal soap | water | Amount (%) | product (g) | time (h) | ratio (%) |
| Ex. 1 | SUS 304 L | | | 51 | 34 | | | 15 | | | | 10.8 | 28 | 6 | 99.81 |
| Ex. 2 | Fe | 60 | | | 13 | 17 | 8 | | | Al—st 2 | | 8.8 | 29 | 4.5 | 99.8 |
| Ex. 3 | alumina | | | 35 | 17 | 10 | 30 | 8 | | | | 16.7 | 17 | 13 | 90.0 |
| Ex. 4 | zirconia | | | 32 | 15 | 9 | 37 | 7 | | | | 18.3 | 16 | 13 | 88 |
| Ex. 5 | SUS 304 L | | | 51 | 34 | | | 15 | | | | 10.7 | 100 | 33 | 98 |
| Ex. 6 | SUS 440 | 60 | | | 20 | | | 10 | 10 | | | 10.7 | 5 | 10.5 | 94 |
| Ex. 7 | Fe | | 75 | | 10 | 5 | | 10 | | | | 9.0 | 29 | 10.5 | 94 |
| Ex. 8 | SUS 304 L hard metal | 57 | | | | 12 | 5 | 12 | | Ca—st 2 | 14 | 11.7 | 30 | 10.5 | 94 |
| Ex. 9 | WC(90%) + Co(10%) | | 60 | | 13 | 17 | 8 | | | | | 8.3 | 29 | 13 | 90 |
| C. Ex. 1 | SUS 304 L | wax mainly comprising ethylene/vinyl acetate copolymer and paraffin wax. | | | | | | | | | | 12 | 20 | 72 | blistering and cracking observed |

Note:
*1: Average molecular weight: 7,000 to 9,000. Ethylene oxide content: 80% by weight.
*2: Average molecular weight: 10,000 to 12,000. Ethylene oxide content: 80% by weight.
*3: Average molecular weight: 17,000 to 26,000. Ethylene oxide content: 80% by weight.
*4: m.p.: 68.3° C.

Referential Example 1

To 100 parts of a ceramic powder (fine ceramic/alumina AL160SG) were added 9.86 parts of polybutyl methacrylate, 4.23 parts of ethylene/vinyl acetate copolymer, 3.16 parts of stearic acid and 1.61 part of dibutyl phthalate. The resulting mixture was kneaded and molded. Then the molded product was degreased by heating from room temperature to 80° C. within 30 minutes, further heating from 80° C. to 380° C. at a rate of 5° C./hr and then maintaining at this temperature for two hours (total degreasing time: 62.3 hours). It is heretofore generally believed that the degreasing of a metal (iron) powder required one to two days.

What is claimed is:

1. A binder composition for injection molding of at least one of metal powder and ceramic powder which comprises polyoxyethylene/polyoxyproplyene condensation polyether as the main component together with from 10 to 100 parts by weight of at least one auxiliary component selected from the group consisting of natural waxes, synthetic waxes, fatty acids and esters per 100 parts of said polyoxyethylene/polyoxypropylene condensation polyether.

2. The binder composition of claim 1 which is solid at room temperature and has a pour point of 40 to 100° C.

3. The binder composition of claim 1 wherein said polyoxyethylene/polyoxypropylene condensation polyether contains 60 to 90% by weight of ethylene oxide.

4. The binder composition of claim 1 wherein said polyoxyethylene/polyoxypropylene condensation polyether has an average molecular weight of 7,000 to 26,000.

5. The binder composition of claim 2 wherein said polyoxyethylene/polyoxypropylene condensation polyether contains 60 to 90% by weight of ethylene oxide.

6. The binder composition of claim 5 wherein said polyoxyethylene/polyoxypropylene condensation polyether has an average molecular weight of 7,000 to 26,000.

7. The binder composition of claim 2 wherein said polyoxyethylene/polyoxypropylene condensation polyether has an average molecular weight of 7,000 to 26,000.

8. The binder composition of claim 3 wherein said polyoxyethlene/polyoxypropylene condensation polyether has an average molecular weight of 7,000 to 26,000.

9. The binder composition of claim 6 wherein said auxiliary component is a natural wax.

10. The binder composition of claim 6 wherein said auxiliary component is a synthetic wax.

11. The binder composition of claim 6 wherein said auxiliary component is a fatty acid.

12. The binder composition of claim 6 wherein said auxiliary component is an ester.

13. The binder composition of claim 6 wherein said auxiliary component is montan wax.

14. The binder composition of claim 6 wherein said auxiliary component is carnauba wax.

15. The binder composition of claim 6 wherein said auxiliary component is stearic acid.

16. The binder composition of claim 6 wherein said auxiliary component is butyl stearate.

17. The binder composition of claim 6 wherein said auxiliary component is paraffin wax.

* * * * *